United States Patent Office 3,009,873
Patented Nov. 21, 1961

3,009,873
CLARIFICATION OF AQUEOUS ORGANIC SUSPENSIONS
Jack D. Kerr and Robert F. Ryan, Midland, Mich., assignors to The Dow Chemical Company, Midland, Mich., a corporation of Delaware
No Drawing. Filed Mar. 5, 1956, Ser. No. 569,246
6 Claims. (Cl. 210—53)

This invention is concerned with the clarification of aqueous suspensions of finely divided or dispersed organic or carbonaceous materials and is particularly directed to a novel method for facilitating such clarification through the use of certain polymer sulfonates.

In the food processing industry, particularly in canneries and sugar refineries, a serious problem is frequently presented by the production of waste water containing in suspension finely divided or dispersed organic materials. Such suspended matter generally settles slowly, if at all, and is also difficult to remove by filtration. Thus the usual methods of sedimentation or filtration for clarifying waste waters are costly or only partially effective when applied to suspensions of organic materials. There are increasing demands for such clarification as, for example, to avoid contaminating lakes and streams with waste waters having a high biological oxygen demand.

Further, in many operations, such as in beet sugar refineries in semi-arid areas, it is desired to clarify waste water for reuse in the process. Similar problems are encountered in coal washing mills where it is desired both to separate clarified water for reuse or disposal from suspensions of finely divided carbonaceous solids and also to recover the economic value represented by the fine coal.

It is an object of the present invention to provide a method of flocculating aqueous suspensions of finely divided organic or carbonaceous materials. It is a further object to provide a method for facilitating the separation of clarified water from such suspensions. Yet another object is to provide a method for decreasing the biological oxygen demand of waste water from food processing and coal washing plants. Other objects will become apparent from the following specification and claims.

According to the present invention, it has been discovered that the incorporation of water soluble sulfonates of high molecular weight poly(vinyl aromatic) compounds in aqueous suspensions of finely divided or dispersed organic materials results in flocculation of the suspended solids, and markedly facilitates the separation of clarified water from such suspensions. It is among the advantages of the invention that flocculation of suspended organic solids is accomplished with relatively small amounts of the polymer sulfonates. It is a further advantage of the invention that the polymer sulfonates co-act favorably with inorganic flocculating agents such as lime.

The polymer sulfonates suitable for use in the practice of the invention may be prepared by the controlled sulfonation of suitable linear, high molecular weight polymers of styrene, alpha-methyl styrene, vinyl toluene, vinyl xylene, ethyl styrene, and linear copolymers of such compounds with one another or with certain acrylic monomers as hereinafter defined. Acrylic monomers suitable for copolymerization with the vinyl-aromatic monomers set forth above include acrylonitrile, methacrylonitrile, and the lower alkyl esters of acrylic acid and methacrylic acid. Such acrylic monomers are suitably copolymerized with one or more of the vinyl aromatic monomers in the proportion of from about 1 to 30 parts by weight of acrylic monomer per 100 parts of the total monomer mixture. The desired high molecular weight polymers or copolymers, hereinafter referred to as base polymers, may be prepared from the monomers by known methods.

The expression "sulfonates of high molecular weight poly(vinyl-aromatic) compounds of the benzene series," as employed in the present specification and claims, refers to a polymer sulfonate product characterized by a low degree of cross linking, having a sulfonate viscosity of from about 100 to 2000 centipoises and preferably from 100 to about 1000 centipoises and derived by sulfonation of a base polymer having a solution viscosity of from about 300 to 100,000 centipoises. The expression "sulfonate viscosity" as used herein refers to the viscosity of an aqueous 0.55 percent by weight solution of the sodium salt form of the purified sulfonate at 25° C. as determined with the Brookfield viscosimeter using the No. 1 spindle at 6 revolutions per minute (Leaman, Rubber Age, vol. 69, pages 702–703). The term "solution viscosity" as employed in the present specification and claims means the viscosity at 25° C. of a 10 percent by weight solution of the base polymer in toluene as determined with a modified Ostwald viscosimeter (1949, ASTM Standards, Part 6, pages 478–479).

In one method of preparation of the desired polymer sulfonates a solid base polymer of the aforementioned class is dissolved in a mixture consisting essentially of from 20 to 80 percent by weight of liquid sulfur dioxide, the remainder being one or more of the compounds methyl chloroform, methylene chloride, ethylene chloride, carbon tetrachloride and tetrachloroethylene. The solution thus formed may contain 5 percent by weight or less, preferably from 0.5 to 2 percent of the polymeric substance which is to be sulfonated. The solution is stirred and maintained at temperatures between —20° and 40° C. and a solution containing 5 percent by weight or less of freshly prepared sulfur trioxide in a separate portion of the aforementioned mixed solvent, or in one of the ingredients of the mixed solvent, is added with stirring. The addition is made quite rapidly over a period of from 1 to 20 minutes and the reaction is carried out under sufficient pressure to maintain a major portion of the solvent mixture in liquid condition. Sufficient sulfur trioxide is employed to provide a proportion corresponding to that theoretically required for the introduction of between 0.7 and 1.1 sulfonic acid radical per aromatic nucleus of the polymer under treatment. Upon completion of the reaction, the polymer sulfonate precipitates from the reaction medium as a granular solid and may be separated by conventional procedures such as filtration, washing with fresh portions of the solvent mixture and drying. The above method of preparation is described more fully in U.S. Patent No. 2,691,644.

The polymer sulfonates as produced in the above mode of preparation are suitable for use directly in accordance with the invention. However, for the proper determination of sulfonate viscosity the polymer sulfonates are purified by extraction with ether to separate residual unreacted sulfur trioxide and sulfuric acid formed in the reaction mixture. The purified sulfonates are dried at 100° C. in a vacuum oven at a pressure of 10 millimeters.

Any other suitable method may be employed for the preparation of the polymer sulfonates provided only that the latter be characterized by water-solubility, low degree of cross-linking and critical viscosity limitations as set forth above.

In carrying out the invention, the polymer sulfonate is incorporated in the suspension of finely divided solids in any suitable manner. For example, the polymer sulfonate may be introduced as a finely divided solid in admixture with a finely divided inert solid or as an aqueous solution. In such operations it is preferred to accomplish rapid and thorough distribution of the polymer sulfonate throughout the suspension of finely divided organic material while avoiding excessive agitation of the mixture subsequent to such distribution. Thus, for example, the polymer sulfonate solution may be introduced into a pipe or flume conveying the suspension, with mixing being accomplished by turbulent flow, or by suitably positioned baffles. In a preferred method of mixing, the polymer sulfonate is introduced portionwise at several points in a flowing stream of suspension. Alternatively, the polymer sulfonate may be dispersed in the suspension while the latter is being held in a settling pond, storage tank or the like.

In practice, it is generally desirable to employ the polymer sulfonates in the form of a relatively dilute aqueous solution to facilitate the incorporation of the active agent in the suspension. Due to the relatively high viscosity of aqueous solutions of the polymer sulfonates, solutions containing more than about 0.5 percent by weight of polymer sulfonate are difficult to handle in most applications and, in general, more dilute solutions containing not more than about 0.1 percent by weight of polymer sulfonate are preferred.

The polymer sulfonate may be employed directly in the free sulfonic acid form or, if desired, the free sulfonic acid form may be dissolved in water and reacted with suitable basic materials to produce water-soluble sulfonates in the form of salts. For example, the free sulfonic acid form may be reacted with ammonia, lithium carbonate, sodium bicarbonate, potassium hydroxide or calcium hydroxide to produce the corresponding ammonium, lithium, sodium, potassium or calcium salt respectively. Other water-soluble salts are prepared in similar fashion. The term "sulfonate" as employed in the present specification and claims is inclusive of the sulfonates in the free sulfonic acid form or in the form of the water soluble salts.

The amount of the polymer sulfonate to be employed in the treatment of suspensions will vary somewhat depending upon such factors as the degree of subdivision of the organic material to be separated or concentrated, the chemical nature and concentration of the organic material and of the aqueous phase, the temperature of the suspension, the degree of improvement in rate of settling or clarification desired and the viscosity characteristics of the polymer sulfonate employed. In general, the amount employed is at least suffifficient to cause flocculation and improve sedimentation. Good results have been obtained when employing from about 1 to 200 parts by weight of the polymer sulfonate per million parts by weight of suspension. Depending upon the nature of the suspended material, improved sedimentation is obtained by incorporating in the suspension from about 0.01 pound to about 10 pounds of the polymer sulfonate per ton of suspended material. In many suspensions, excess dosages of the polymer sulfonates are to be avoided since there appears to be an intermediate dosage giving a maximum improvement in sedimentation and higher dosages may even stabilize the suspension.

In many aqueous organic suspensions, the polymer sulfonates co-act favorably with lime in improving flocculation and sedimentation. In a preferred method of operation, lime is incorporated in the suspension of organic material to adjust the pH to from about 8.5 to 11.5 and thereafter the polymer sulfonate is added as set forth above. Such liming may be accomplished by the addition of finely divided calcium oxide or hydroxide or of milk of lime or calcium hydroxide solutions. The expression "liming" as hereinafter employed refers to the aforementioned operation.

The following examples illustrate the invention, but are not to be construed as limiting the same.

*Example 1*

A slurry, representative of waste from a soup cannery, contained about 1 percent by weight of finely divided ingredients of pea soup in aqueous suspension. The slurry had been treated with sufficient calcium hydroxide to bring the pH thereof to about 11. Portions of the above slurry were placed in 100 milliliter cylinders and mixed with various polymer sulfonates. The polymer sulfonates were added in the form of aqueous 0.05 percent by weight solutions, and the addition was carried out portionwise with gentle thorough mixing accomplished by repeated inversions of the cylinders. In each operation 5 milliliters of polymer sulfonate solution was added to 100 milliliters of the cannery waste slurry to provide a dosage of about 25 parts by weight of polymer sulfonate per million parts of the total suspension. Following the addition of the polymer sulfonates, the cylinders were brought to an upright position to initiate sedimentation. An untreated 100 milliliter portion of the original slurry was also agitated by inversion and allowed to settle to serve as a check. The volume of supernatant liquid above the settled solids was observed after 1 and 2 minutes of sedimentation. The results are summarized in the following table wherein the polymer sulfonates are identified in terms of the base polymer or copolymer from which the sulfonate was derived and characterized by the corresponding sulfonate viscosity and solution viscosity.

| Base polymer or copolymer | Solution viscosity centipoises | Sulfonate viscosity centipoises | Volume of supernatant liquid after— | |
|---|---|---|---|---|
| | | | 1 minute | 2 minutes |
| Untreated check | | | 0 | 10 |
| Polyvinyltoluene | 921 | 715 | 47 | 58 |
| Do | 1,800 | 215 | 62 | 70 |
| Copolymer of 95 percent vinyltoluene-5 percent acrylonitrile | 779 | 785 | 53 | 65 |
| Do | 563 | 380 | 57 | 66 |
| Do | 779 | 430 | 54 | 64 |
| Do | 779 | 1,060 | 48 | 62 |
| Do | 563 | 1,700 | 49 | 63 |
| Do | 2,474 | 492 | 51 | 65 |
| Copolymer of 96 percent vinyltoluene-4 percent acrylonitrile | 527 | 245 | 56 | 67 |

*Example 2*

Further 100 milliliter portions of the slurry of Example 1 were treated with polymer sulfonates by the method of Example 1 except that 0.5 milliliter of polymer sulfonate solution was employed to provide a dosage of 2.5 parts by weight of polymer sulfonate per million parts of suspension. The results are summarized in the following table.

| Base polymer or copolymer | Solution viscosity, centipoises | Sulfonate viscosity, centipoises | Volume of supernatant liquid after— | |
|---|---|---|---|---|
| | | | 1 minute | 2 minutes |
| Untreated check | | | 0 | 10 |
| Polyvinyltoluene | 1,800 | 215 | 40 | 66 |
| Copolymer of 95 percent vinyltoluene-5 percent acrylonitrile | 2,474 | 492 | 40 | 65 |
| Do | 563 | 480 | 40 | 65 |
| Copolymer of 96 percent vinyltoluene-4 percent acrylonitrile | 527 | 245 | 40 | 65 |

*Example 3*

An aqueous slurry of coal fines from a coal crushing and cleaning mill contained 5 percent by weight of solids in suspension. Equal portions of this slurry were placed in cylindrical settling vessels and mixed with various polymer sulfonates. The polymer sulfonates were added portionwise in the form of aqueous 0.05 percent by weight solutions with mixing by repeated inversions of the settling vessels. In each case, a polymer sulfonate was added at the rate of 0.2 pound per ton of suspended solids. An equal untreated portion of the slurry was agitated similarly to serve as a check. All the cylinders were brought to an upright position to initiate sedimentation and the depths of clarified supernatant liquid determined at intervals thereafter to obtain the settling rates. The results are summarized in the following table.

| Base polymer or copolymer | Solution viscosity, centipoises | Sulfonate viscosity, centipoises | Settling rate, inches per minute |
| --- | --- | --- | --- |
| Untreated check | | | 0.15 |
| Polyvinyltoluene | 921 | 715 | 3.30 |
| Do | 1,800 | 215 | 2.75 |
| Copolymer of 95 percent vinyltoluene-5 percent acrylonitrile | 563 | 380 | 2.71 |
| Copolymer of 96 percent vinyltoluene-4 percent acrylonitrile | 527 | 245 | 2.76 |

*Example 4*

A further determination was carried out using the slurry and method of Example 1 except that the polymer sulfonate, having a sulfonate viscosity of 715 centipoises and derived from a polyvinyltoluene characterized by a solution viscosity of 921, was employed at a dosage of 0.1 pound per ton of suspended coal fines. It was found that the suspension so treated settled at the rate of 1.42 inches per minute.

*Example 5*

First carbonation juice from a beet sugar refinery contained about 10 percent of sugar in solution and about 4 percent by weight of finely divided suspended solids, chiefly organic in nature. The juice had been limed to a pH of 11 to 11.5 and was at a temperature of about 95° C. 100 milliliters of the juice was mixed in a cylindrical settling vessel with sufficient of a polymer sulfonate to provide a loading of 0.5 pound of the sulfonate per ton of suspended solids in the juice. The addition of the polymer sulfonate was portionwise with gentle mixing by inversion of the vessel and an aqueous 0.05 percent by weight solution of the sodium salt form of the sulfonate was employed. The polymer sulfonate had a sulfonate viscosity of 105 centipoises and was derived from a polyvinyltoluene having a solution viscosity of 921 centipoises. The treated suspension settled rapidly to yield 20 milliliters of clear overhead in 10 seconds and 30 milliliters of clear overhead in 21 seconds while an untreated 100 milliliter portion of the juice yielded only 5 milliliters of cloudy overhead in 265 seconds.

*Example 6*

Waste water from a beet sugar refinery was treated with lime and fed to a Dorr thickener of 80,000 gallons capacity at the rate of 300 to 500 gallons per minute to separate suspended solids by sedimentation. At the 500 gallon per minute rate the residence time for liquid in the thickener was 2 hours and 40 minutes. The lime treatment brought the water to a pH of about 10.5. The suspended solids were very finely divided and predominantly organic in nature. Sufficient organic matter was carrying over in the effluent from the thickener to create a 5-day biological oxygen demand of about 300 parts per million in the effluent.

A pumping system was arranged to introduce polymer sulfonate continuously into the feed to the thickener. The polymer sulfonate was introduced as an aqueous 0.5 percent by weight solution of the sodium salt form in the amount of about 2.5 parts by weight of polymer sulfonate per million parts of total waste water. The polymer sulfonate employed was a commercial lot blended from several batches of individual polymer sulfonates having sulfonate viscosities of from about 150 to 250 centipoises and all derived from a polyvinyltoluene having a solution viscosity of 921 centipoises.

At the time that the incorporation of the polymer sulfonate in the waste water was initiated, the contents of the thickener were very turbid so that it was difficult to see six inches into the water at the outlet periphery of the thickener. Shortly after the introduction of the polymer sulfonate began, an excellent degree of flocculation of the suspended solids was observed in the inlet to the thickener. 2.25 hours after initiation of the treatment, it was observed that excellent flocculation was apparent throughout the thickener and about twelve inches of clarified freeboard existed at the periphery. One hour after the above observation, clarification had continued to improve and about 3 feet of clarified freeboard was present at the periphery of the thickener.

Samples of the effluent from the above thickener were taken at intervals and tested for five-day biological oxygen demand. As a check, about sixteen hours after the addition of polymer sulfonate was discontinued, a sample of effluent, representing normal plant practice, was taken for testing for biological oxygen demand. The results are reported in the following table.

| Time of sampling, hours after initiation of treatment | 5-day biological oxygen demand, parts per million |
| --- | --- |
| 2.25 | 20 |
| 3.25 | 0 |
| 4.25 | 0 |
| (¹) | 280 |

¹ Untreated check.

In a similar fashion, a polymer sulfonate having a sulfonate viscosity of 150 centipoises and derived from a polystyrene characterized by a solution viscosity of 1350 centipoises is incorporated in a sugar refinery waste liquor in the amount of 5 parts by weight per million parts of liquor to improve clarification of the liquor and decrease biological oxygen demand of the clarified effluent.

We claim:

1. A method for facilitating the separation of clarified water from aqueous suspensions of finely divided organic solids which comprises the step of incorporating in the suspension a water-soluble sulfonate of a high molecular weight poly(vinyl-aromatic) compound of the benzene series in an amount sufficient to cause flocculation and increase the rate of sedimentation of the suspended solids, said sulfonate being characterized by a sulfonate viscosity of from about 100 to 2000 centipoises and derived by sulfonation of a base polymer having a solution viscosity of from about 300 to about 100,000 centipoises.

2. A method according to claim 1 wherein the sulfonate is employed in the amount of from about 0.01 to about 10 pounds per ton of solids in the suspension.

3. A method according to claim 1 wherein the sulfonate is derived from a polyvinyltoluene.

4. A method according to claim 1 wherein the sulfonate is derived from a copolymer of vinyltoluene with from about 1 to 30 percent by weight of acrylonitrile based on the total weight of vinyltoluene and acrylonitrile in the copolymer.

5. A method according to claim 1 wherein the sulfonate is incorporated in the suspension in the form of a dilute aqueous solution and thereafter the suspension is maintained under conditions of minimal agitation to separate a clarified supernatant liquid fraction and a fraction concentrated with respect to the solids.

6. A method for facilitating the separation of clarified water from aqueous suspensions of finely divided organic solids which comprises liming the suspension to adjust the pH thereof to about 8.5 to 11.5 and thereafter incorporating in the suspension a water-soluble sulfonate of a high molecular weight poly(vinyl-aromatic) compound of the benzene series in an amount sufficient to cause flocculation and increase the rate of sedimentation of the suspended solids, said sulfonate being characterized by a sulfonate viscosity of from about 100 to 2000 centipoises and derived by sulfonation of a base polymer having a solution viscosity of from about 300 to about 100,000 centipoises.

References Cited in the file of this patent

UNITED STATES PATENTS

| | | |
|---|---|---|
| 2,104,728 | Bertsch et al. | Jan. 11, 1938 |
| 2,236,930 | Uytenbogaart | Apr. 1, 1941 |
| 2,354,146 | Samuel | July 18, 1944 |
| 2,607,750 | Wilson et al. | Aug. 19, 1952 |
| 2,625,529 | Hedrick et al. | Jan. 13, 1953 |
| 2,694,702 | Jones | Nov. 16, 1954 |
| 2,817,649 | Contois | Dec. 24, 1957 |
| 2,847,403 | Contois | Aug. 12, 1958 |

FOREIGN PATENTS

| | | |
|---|---|---|
| 176,184 | Austria | Sept. 25, 1953 |
| 163,501 | Australia | June 22, 1955 |

OTHER REFERENCES

Michaels: "Aggregation of Suspensions by Polyelectrolytes," 46, Ind. & Eng. Chem., 1485–1490 (1954).